Nov. 17, 1942.  N. B. COLEY  2,302,007
SWITCH AND SIGNAL CONTROL SYSTEM FOR RAILROADS
Filed Aug. 13, 1940  5 Sheets-Sheet 4
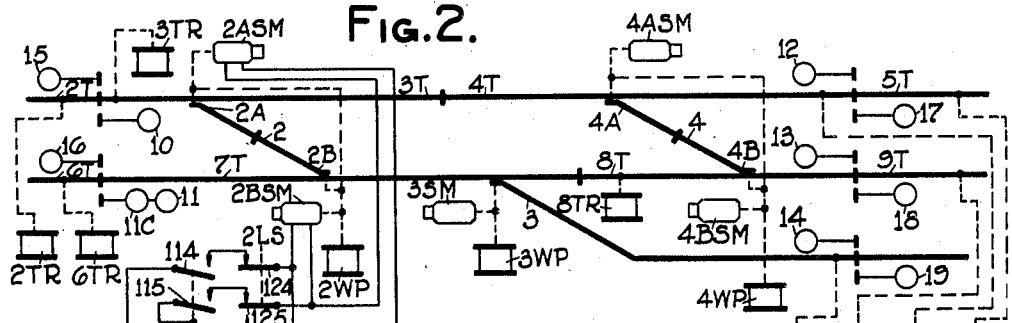
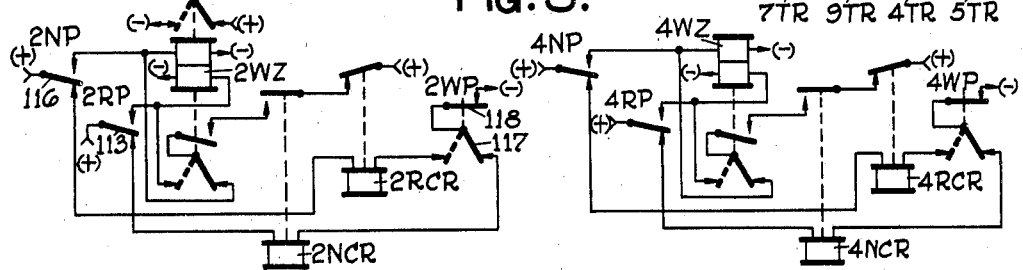
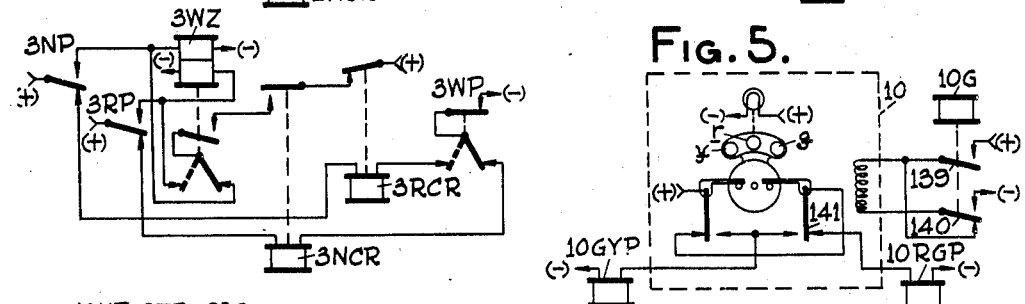
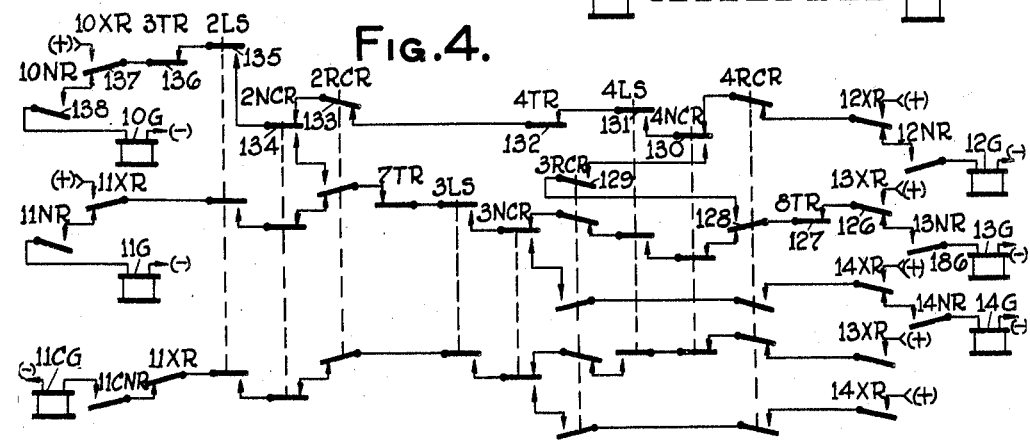
INVENTOR
N. B. Coley
BY Neil W. Preston
his ATTORNEY Nov. 17, 1942.   N. B. COLEY   2,302,007

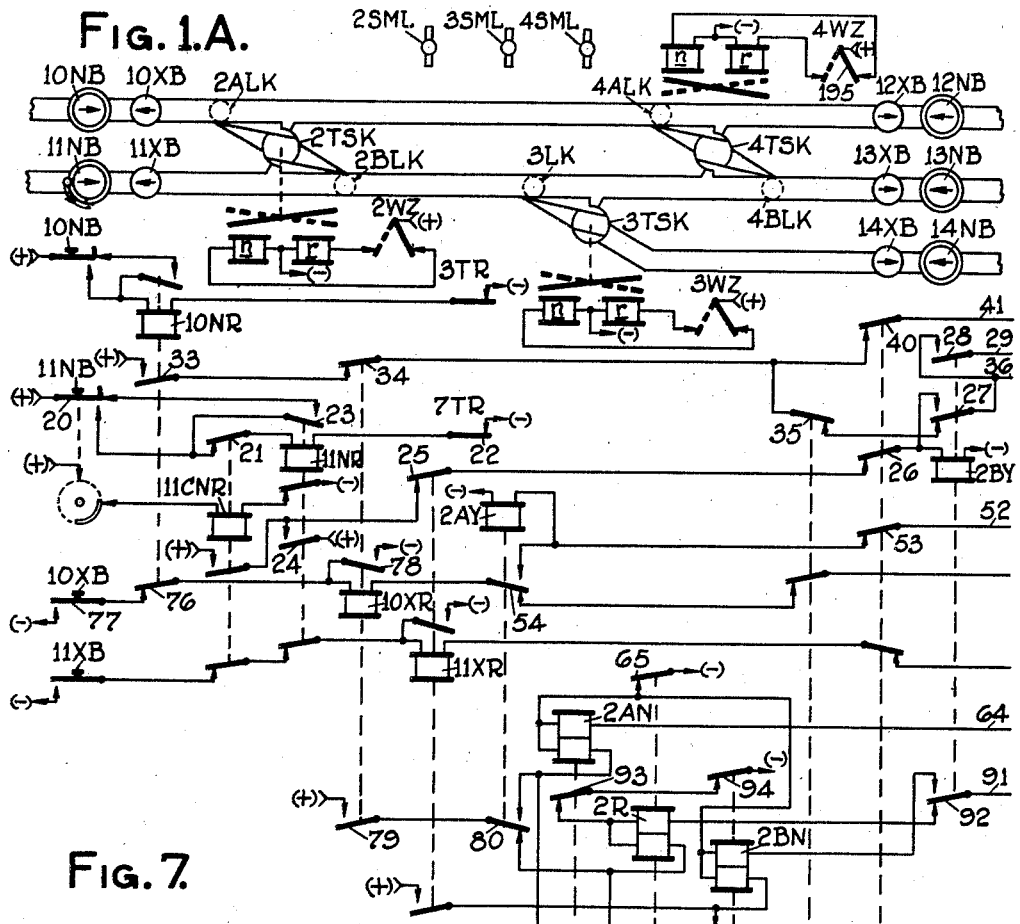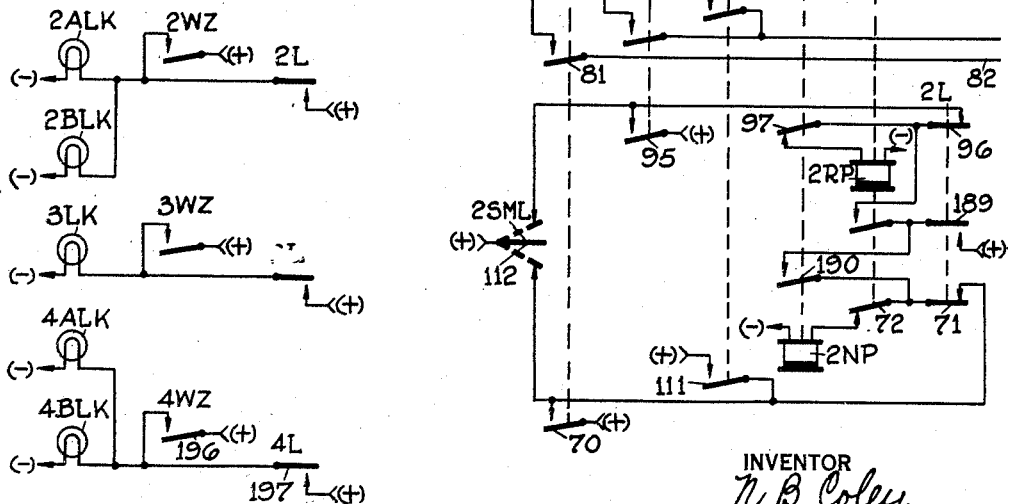

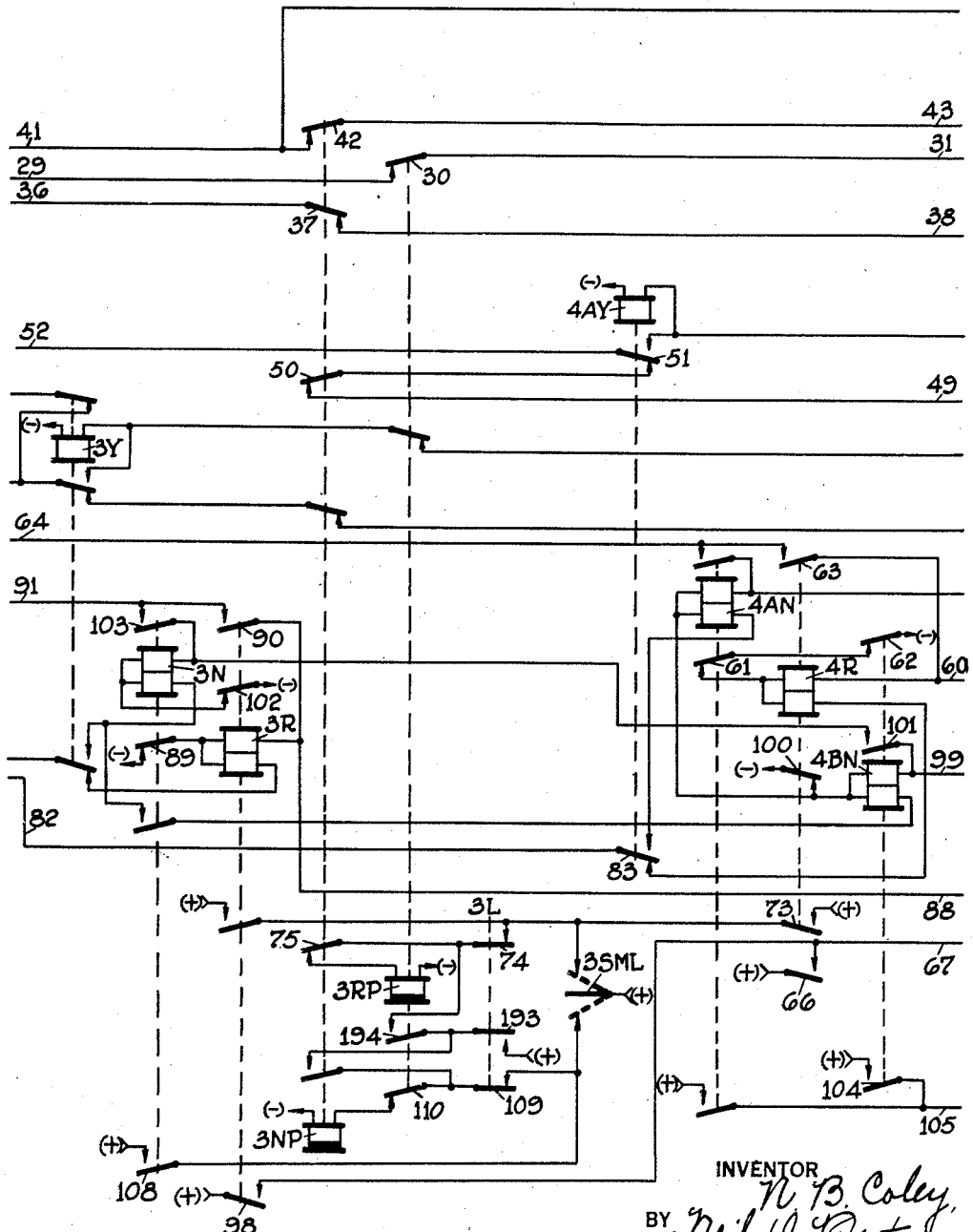
Fig. 1.B.

SWITCH AND SIGNAL CONTROL SYSTEM FOR RAILROADS

Filed Aug. 13, 1940   5 Sheets-Sheet 5

Patented Nov. 17, 1942

2,302,007

UNITED STATES PATENT OFFICE 2,302,007

SWITCH AND SIGNAL CONTROL SYSTEM FOR RAILROADS

Nelson B. Coley, Rochester, N. Y., assignor to General Railway Signal Company, Rochester, N. Y.

Application August 13, 1940, Serial No. 352,373

18 Claims. (Cl. 246—134)

This invention relates to switch and signal control systems for railroads, and it more particularly pertains to such systems of the entrance-exit type.

In an entrance-exit system a control machine is provided at a control office having a control panel upon which is a miniature track diagram of a track layout for which the system is provided. The establishment of each route through the track layout is effective responsive to the actuation by an operator of control buttons disposed on the track diagram at points corresponding to the respective entrance and exit ends of routes, such ends being usually defined at the track layout by the location of wayside signals. In addition to such route control, each signal track switch or the track switches of each crossover can be governed individually in accordance with the actuation by an operator of an auxiliary switch control lever for that track switch or crossover. An entrance-exit system for providing such general operation can be of the character disclosed, for example, in the patent to A. Langdon, Patent No. 2,148,865, dated February 28, 1939. In that patent route conditioning relays provided for the various track switches are selectively energized responsive to the designation by an operator of the entrance end of a route, and the energization of such relays, for track layouts where alternative or optional routes are involved extending between certain entrance and exit points, determines which of such routes is to be established after the operator has designated the exit point. If the preferred one of the alternative routes between the entrance and exit points designated is not available, in accordance with that patent, the system automatically causes the establishment of another route that is available.

An object of the present invention is to so govern the control of switch conditioning relays similar to those disclosed in the above mentioned patent that only a predetermined route can be established extending between designated entrance and exit points, irrespective of the number of possible alternative routes extending between those points. If such predetermined route is not available when its route ends are designated by an operator, no route is established, although other routes might appear to be available at that time between the designated entrance and exit points. Such mode of operation is desirable in practice where some of the alternative routes if established would prevent use of main line routes, or would allow the passage of a train over low speed trackway not intended for that class of train.

Another object of the present invention is to provide in an entrance-exit system derail protection in such a manner that a route can be selected by the self-selecting part of the system only if the track switches required for derail protection for that route are free to be operated to their required positions. That is, the establishment of a route responsive to the designation of the exit end of that route becomes effective only if each track switch required for derail protection for that route is free to be operated to its required position.

Another object of the present invention is to cause the derail protection to be effective for each route set up in accordance with entrance-exit designation, but not to be effective for the setting up of routes in accordance with the operation of the auxiliary switch control levers. Such mode of operation simplifies and facilitates the operation of any track switch in accordance with the auxiliary control lever for that track switch for the purpose of freeing the switch points of obstructions.

Another object of the present invention is to lock the derail switches for derail protection of each established route in accordance with the effectiveness of rear release route locking for the portion of the route for which such derail protection is provided. In this manner it is provided that a switch used for derail protection is locked only so long as it can afford protection for a portion of an established route.

Other objects, purposes and characteristic features of the present invention will be apparent upon reference to the accompanying drawings and as they are hereinafter pointed out in the description of the present invention.

In describing the invention in detail, reference will be made to the accompanying drawings in which like reference characters designate corresponding parts throughout the several illustrations, in which similar letter reference characters are used to designate parts of a similar general nature, such parts being generally made distinctive by reason of preceding numerals representative of locations along the track layout, and in which:

Figs. 1A, 1B, and 1C when placed side by side, illustrate a section of the control panel of the control machine used for this embodiment of the present invention, together with route establishing means provided for the setting up of each desired route through the track layout;

Fig. 2 illustrates the track layout for which the entrance-exit system for this embodiment of the present invention is provided;

Fig. 3 illustrates the circuits provided for the power operation of the track switches of the track layout and for repeating the correspondence condition of such track switches with switch positions which have been called for;

Fig. 4 illustrates signal control circuits for certain signals illustrated in Fig. 2.

Fig. 5 illustrates a typical searchlight signal together with clear and stop signal repeater relays for that signal;

Fig. 7 illustrates control circuits for indicator lamps disposed along the track diagram shown in Fig. 1A.

Figure 1C:
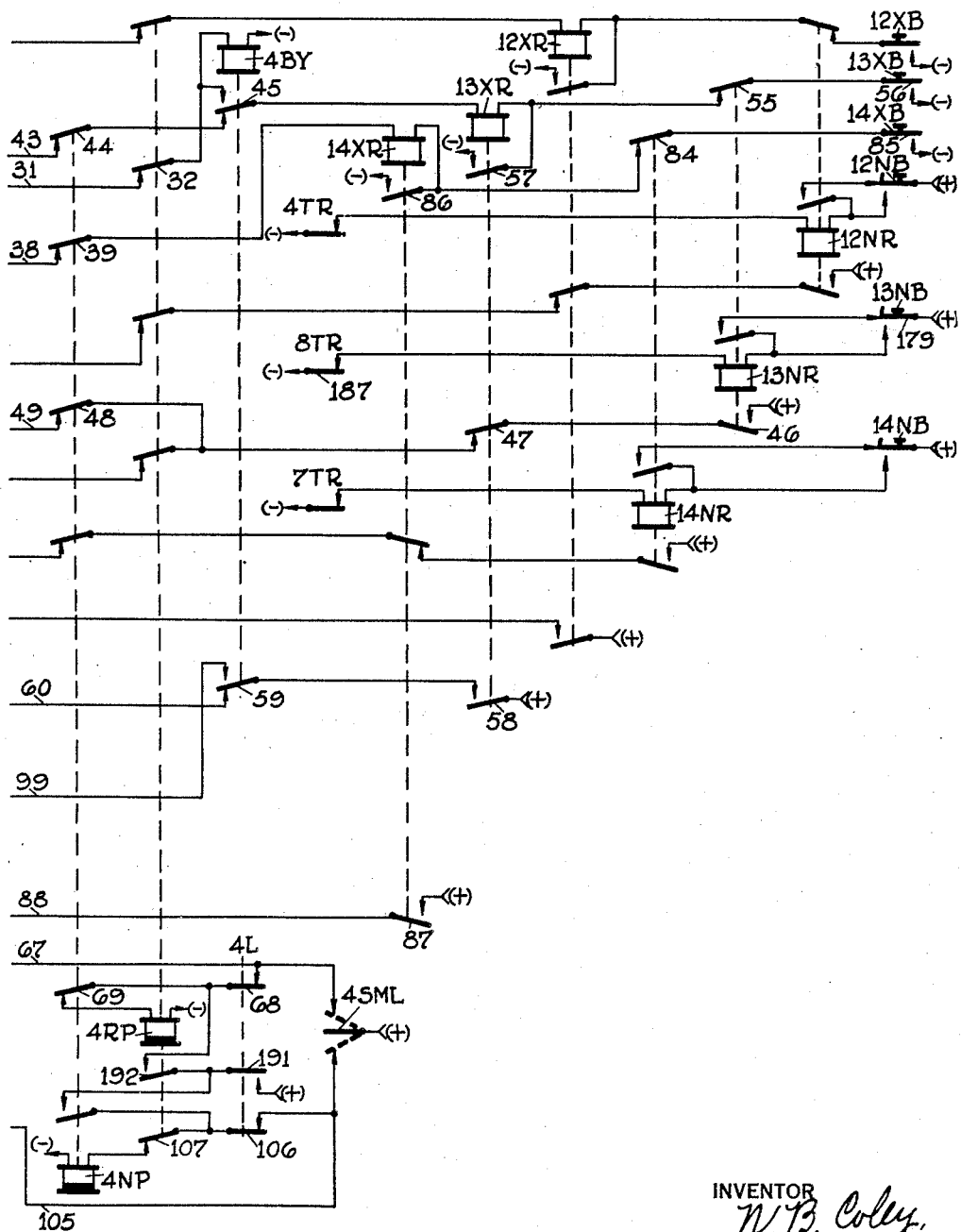

For the purpose of facilitating in the description of the present invention reference is made from time to time in the description to functions common to all parts of a similar kind or class by use of the letter reference characters common to such parts without their distinctive preceding numerals. Such a reference is to be understood to apply to any parts designated in the accompanying drawings by letter reference characters that are similar except for preceding numerals.

Various diagrammatic and conventional illustrations have been employed in the drawings for the purpose of simplifying the disclosure of the present invention as to the principles involved and the mode of operation, rather than for attempting to show the specific construction and arrangement of parts that would be employed in practice. Thus, the various relays and their contacts are illustrated in a conventional manner, symbols are used to indicate the connections to the terminals of batteries or other sources of electric current, and certain circuit details well known to those familiar with the art are merely indicated by dotted lines. For simplicity some of the circuits have been shown in the conventional written circuit manner, each contact being identified as associated with a particular relay by the reference character of such relay directly above it.

The symbols (+) and (—) are employed to indicate the positive and negative terminals respectively of suitable batteries or other sources of direct current, and the circuits with which those symbols are used always have current flowing in the same direction. If alternating current is used instead of direct current, the symbols are to be considered as representative of the instantaneous relative polarities.

*Track layout.*—With reference to Fig. 2, the track layout for this embodiment of the present invention is illustrated as having two main tracks interconnected by crossovers 2 and 4, and the lower one of such tracks having another track connected thereto by a single track switch 3. The crossover 2 has track switches 2A and 2B, and the crossover 4 has track switches 4A and 4B associated therewith.

Although a comparatively simple track layout is illustrated in this embodiment of the present invention, it is to be understood, and it will be more readily apparent as the description of the invention progresses, that the principles and general mode of operation in accordance with the present invention for the particular track layout shown in Fig. 2 are readily applicable to practically any complex track layout to be encountered in practice.

A power switch machine SM is provided for the operation of each of the track switches, and the structure of such switch machine can be as shown, for example, in the patent to W. K. Howe, Patent No. 1,466,903, dated September 4, 1923. The switch machine motors can be controlled, for example, as shown in the patent to W. H. Hoppe et al., Patent No. 1,877,876, dated September 20, 1932, to provide features generally required in the control of the switch machines such as overload protection. The switch machines 2ASM, 2BSM, 3SM, 4ASM, and 4BSM are provided for the power operation respectively of the track switches 2A, 2B, 3, 4A and 4B.

The locked position of the track switches is repeated in the usual manner by a polar neutral normally energized switch repeater relay WP for each crossover and for each single track switch, such relay being energized with a polarity to operate its polar contacts to a right-hand position when the switch machines SM and track switches with which it is associated are in their respective normal locked positions. When those track switches and the switch machines are in corresponding reverse locked positions, the relay WP associated therewith is energized with its polar contacts operated to a left-hand position. Such WP relay is deenergized except when either of the two above conditions is fulfilled. The circuits for governing the WP relays are selected by suitable switch point detector contact mechanisms such as is shown, for example, in the patent to C. S. Bushnell, Patent No. 1,517,236, dated November 25, 1924.

Signals 10, 11, 11C, 12, 13 and 14 are provided for governing traffic through the track layout, signals 10, 11, and 11C being provided for governing east-bound traffic (to the right), and signals 12, 13 and 14 being provided for governing west-bound traffic (to the left).

The signals are assumed to be of the searchlight type having operating mechanisms as typically shown diagrammatically in Fig. 5, and as more fully disclosed, for example, in the patent to O. S. Field, Patent No. 1,835,150, dated December 8, 1931. Each signal mechanism when deenergized causes the signal to display a red stop indication, when energized with one polarity causes the signal to display a yellow caution indication, and when energized with the opposite polarity causes the signal to display a green clear indication. In order to simplify the disclosure of the present invention, it is assumed that all of the signals are low speed signals, but the circuits are so arranged as hereinafter pointed out that it will be readily apparent to those familiar with the art how green clear indications can be provided as required in practice. The signal 11C is a call-on signal provided to allow a train to proceed when the route immediately in advance of the signal is occupied by a train. The signals 15, 16, 17, 18, and 19 are signals governing traffic out of the track layout under consideration in this embodiment of the present invention, and such signal can be either automatically or manually governed in accordance with the requirement of practice. It is to be understood that other types of signals such, for example, as semaphore signals and color light signals having individual color lamp units, can as well be used.

The track layout is divided into track sections by insulated joints in the usual manner, and it is to be understood that the usual type of track circuits are provided. Track relays 2TR, 3TR, 4TR, 5TR, 6TR, 7TR, 8TR, and 9TR are illustrated as being governed by track circuits for track sections 2T, 3T, 4T, 5T, 6T, 7T, 8T and 9T respectively. The track switches are, of course, bonded to provide fouling protection.

*Control machine.*—A control machine for use in the entrance-exit system provided by the present invention has a control panel within convenient reach of an operator upon which is a miniature track diagram (see Fig. 1A) corresponding with the track layout in the field for which the system is provided. Disposed on the track diagram at points comparable to the signal locations at the track layout are entrance buttons NB and exit buttons XB for designation of the respective entrance and exit ends of each route to be established. Suitable indications are provided along the miniature track diagram to keep an operator well informed as to the condition of the route establishing means, the condition of occupancy of the various track sections, and the condition of the signals governing entrance to the routes. Such indications can be provided by the illumination of strips of light along the track portions of the diagram, or the indications can be provided by points of light disposed at various positions along the track portions of the track diagram, and the position of the track switches can be indicated by movable point indicators as shown in Fig. 1A.

The entrance buttons 10NB, 11NB, 12NB, 13NB, and 14NB are provided for designation of entrance points governed by signals 10, 11, 12, 13 and 14 respectively. Each of the buttons NB is of the push-pull type, being biased to a normal position from which it can either be depressed or pulled out. Each of the buttons NB has a normal closed contact which is opened only when such button is pulled out from its normal position, and another contact closed only when that button is depressed. The construction of a control button to provide such operating conditions can be provided, for example, as shown in the application of J. F. Merkel, Ser. No. 158,720, filed August 12, 1937.

The exit buttons 10XB, 11XB, 12XB, 13XB and 14XB are provided for exit points at the respective signal locations 10, 11, 12, 13 and 14, and each of such buttons is of the self-restoring push button type having a contact closed only when such button is depressed. It is to be understood that other operating positions for the entrance and exit buttons NB and XB can be provided in accordance with the requirements of practice, and that a single button can be provided for each route end for designation of both entrance and exit points having a sufficient number of distinctive positions to provide the distinctive controls required in practice. It is also to be understood that single route end buttons can also be used in combination with circuit means for selecting the desired number of operating conditions responsive to the actuation by an operator of the buttons in a particular sequence.

Above the track diagram on the control panel is an auxiliary switch control lever SML for each of the various crossovers and single track switches in the track layout as an auxiliary means for causing the establishment of routes, and as a means for causing the individual operation of the various crossovers and single track switches for freeing the track switches of obstructions.

*System devices.*—An entrance relay NR (see Fig. 1A) is provided for each of the entrance points, and such relay is picked up upon the depression of the button NB for that entrance point, and is maintained energized until restoration is effected either by designation by an operator, or by passage of a train past that entrance point.

A relay XR is provided for each of the exit points, and such relay is picked up upon designation of that exit point by the depression of the exit button XB associated therewith, it being maintained energized dependent upon the energized condition of the entrance relay NR for the entrance end of the route being established.

A switch conditioning relay Y is provided for each track switch, and such Y relay is energized responsive to the designation of an entrance point by an operator if its track switch can be trailed in a predetermined position in an available route extending from such entrance point. Where the track layout provides optional routes, the energization of certain Y relays for track switches renders certain of the optional routes unavailable for establishment.

Normal and reverse switch position selecting relays AN, BN and R are provided for each crossover for the establishment of each route in accordance with the designation by an operator of the respective entrance and exit ends of such route, the relay AN being provided for establishment of routes including the track switch the A end of that crossover in a normal position and the relay BN being provided for the establishment of routes including the track switch at the B end of that crossover in a normal position. The relay R for each of the crossovers is energized when the reverse position of the track switches of that crossover is required for the establishment of a route extending between designated entrance and exit points. Each of the relays AN, R, BN and N (provided for a single track switch) is used only in the establishment of routes in accordance with entrance-exit designation.

A normal switch control relay NP and a reverse switch control relay RP is provided for each single track switch and for each crossover for causing the operation of that track switch or crossover if its position is called for either by the energization of an AN, BN, N or R relay, or in accordance with the operation to a normal or reverse operating position of the auxiliary switch control lever SML for that particular track switch. The relays NP and RP for each of the various track switches are also used to cause the power operation of that track switch if such switch is required to be operated to provide derail protection. The selective energization of those relays for providing derail protection is effected when the route to be protected is set up by entrance-exit control, but not when such route is set up by the use of the various auxiliary switch control levers.

A polar neutral relay WZ is provided for each crossover and for each single track switch for causing its operation to a position corresponding with the position selected by the NP or RP relay energized for that track switch. Each of the relays WZ provides a means for reversal of its track switch in midstroke, and a means for causing the follow-through of its switch operation once operation has been initiated.

Normally energized directional stick relays ES and WS (see Fig. 6) are provided for route locking purposes, an ES and a WS relay being provided for each track section. The restoration of such route locking relays after the route locking has become effective is dependent upon approach and time lock relays AS, one relay being associated with each entrance point.

A normally energized lock relay L is provided for each track switch, and such relay is dropped away in the usual manner whenever the electric locking provided for that track switch is effective. A normally energized lock stick relay LS is provided for each crossover and each single track switch. Each of the relays LS is dropped away after the track switch with which it is associated completes its operation in accordance with a switch control defined, and the dropping away of that relay closes a branch of the signal control circuit to signify that such track switch has been properly positioned in accordance with the position called for.

Correspondence relays NCR and RCR are provided for repeating the respective normal and reverse positions of each track switch in correspondence with the position called for by the energization of an NP or RP switch control relay for that track switch.

The indication of each of the signals is governed in accordance with the energization of a signal control relay G, which is picked up only after a route is completely established having such signal as an entrance point.

To consider more specifically the mode of operation of the system provided by the present invention and the principles involved, various typical operating conditions will hereinafter be described.

Operation

The general mode of operation of the system of the present invention includes certain principles as described in the above mentioned patent to A. Langdon, Patent No. 2,148,865, dated February 28, 1939, and reference is to be made to that patent for a more complete disclosure of some of such principles, however, some of those principles are hereinafter briefly stated in order to more clearly disclose the novel features of the present invention. In that patent the actuation of a button for designation of an entrance point causes the picking up of a switch conditioning relay for each track switch that can be trailed in a normal position in a route which would be available for passage of a train from that entrance point. Such relays are energized in circuit networks conveniently called "initiating networks," there being one network provided for each direction of traffic. Each of the initiating networks has a circuit portion corresponding to each of the routes at the track layout, and has feed points comparable to entrance points at the track layout for the direction of traffic for which that circuit network is provided. The switch conditioning relays are connected in the networks at points comparable to the switches for which they are provided, and an exit relay is connected to each point in the network for that particular direction of traffic comparable to an exit point at the track layout. Energy feeding through the network responsive to entrance designation therefore conditions the positions for certain of the track switches by the selective energization of the switch conditioning relays and also conditions for energization an exit relay for the exit point of each route available for use emanating from that entrance point. An exit relay can be picked up responsive to exit designation only after it has been properly conditioned responsive to entrance designation by energy feeding through the initiating circuit network for that direction of traffic.

Where alternative or optical routes are involved, energy feeding through the initiating network responsive to entrance designation, according to that patent, so conditions the positions of the track switches by the selective energization of the switch conditioning relays that the available route diverging nearest the designated entrance point is preselected so that it will be subsequently established upon the designation of the exit end of that route in preferance to any alternative routes which may be available for use at that time. According to such mode of operation, should the route diverging nearest the designated entrance point be unavailable for use, another route will be automatically established if such route is available. The system provided by the present invention operates according to these principles with certain limitations applied as hereinafter pointed out to the manner in which a route is selected where possible alternative or optional routes are involved.

Responsive to the designation of an exit point for a route, subsequent to the designation of the entrance end thereof, a "completion circuit network" for the energization of normal and reverse switch position selecting relays is energized, there being one completion network provided for each direction of traffic. The circuits for the switch position selecting relays are so selected by the switch conditioning relays that those relays are selectively energized upon exit designation to correspond with the required positions of the track switches for the route extending between the designated entrance and exit points. This mode of operation holds true even where optional or alternative routes are involved, the track switches of such routes having their switch conditioning relays selectively energized responsive to entrance designation in such a manner as to properly select the circuits for the switch position selecting relays to correspond with the particular route which has been given preference.

*Normal conditions.*—The conditions of the system which are in effect at the time when the track layout is unoccupied by trains, when there are no routes established or partially established through the track layout, and when the signals governing entrance to the track layout are all at stop, are conveniently called "normal conditions." When such normal conditions are in effect, the indicator lamps on the control panel are dark to indicate to an operator that such conditions exist. The relays associated with the route establishing part of the system as illustrated in Figs. 1A, 1B, and 1C are normally deenergized, and the relays WZ shown in Fig. 3 which are used in more directly controlling the track switches are also normally deenergized.

Figure 6:
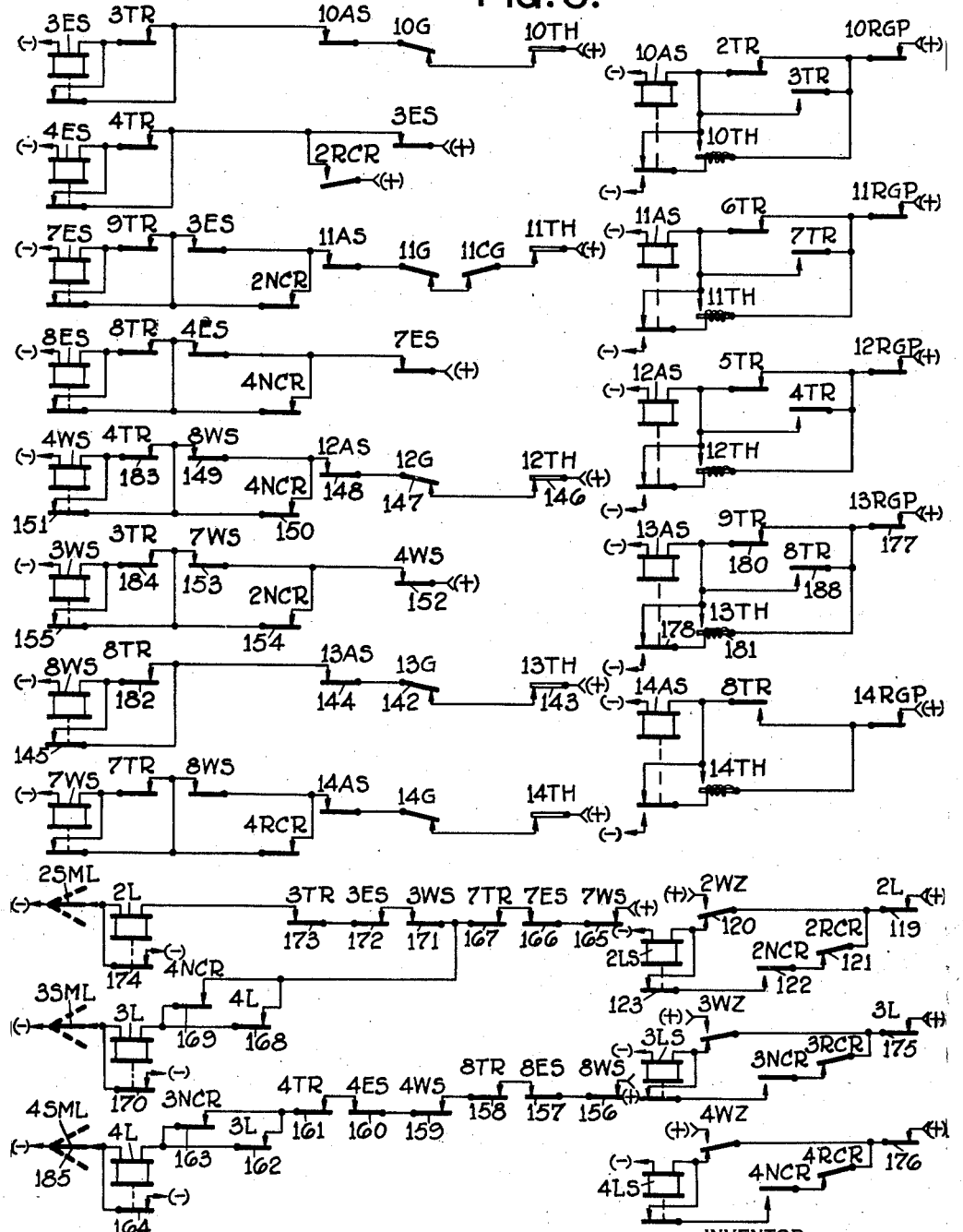
Fig. 6 illustrates control circuits relative to the electric locking of the track switches.

Those relays relating more to the safe operation of the track switches such as are shown in Fig. 6 are normally energized for purposes well known to those familiar with the art and the signal-at-stop repeater relays RGP are normally energized as is typically shown by an obvious circuit for relay IORGP (see Fig. 5). Each of the relays WP is of course normally energized, and a corresponding relay NCR or RCR is energized to correspond with the position to which its track switch has been last operated. It has been assumed that the last called for positions of the track switches of the track layout were normal as would be required for through routes established on the two parallel main tracks.

*Initiation responsive to entrance designation.*— If an operator designates an entrance point for a route to be established by the actuation of the entrance button NB (see Fig. 1A) for such point, an entrance relay NR is picked up, and the picking up of that relay applies energy to the circuit network for that direction of traffic for the conditioning of each relay XR for the exit end of an available route emanating from that entrance point, and for selectively energizing the switch conditioning relays Y associated with the track switches of such available routes. Thus, for example, the depression of the button 11NB for designation of an entrance point for a route at signal 11 causes the picking up of the entrance relay 11NR by the energization of a circuit closed from (+), including contact 20 of button 11NB in a depressed position, back contact 21 of relay 11CNR, winding of relay 11NR, and front contact 22 of relay 7TR, to (—). When that relay is picked up a stick circuit is established extending from (+), including contact 20 of button 11NB which is closed when that button is in a normal or a depressed position, front contact 23 of relay 11NR, back contact 21 of relay 11CNR, winding of relay 11NR, and front contact 22 of relay 7TR, to (—).

Upon the picking up of relay 11NR, the relays 2BY and 4BY are successively energized because the track switches for which they are provided can be trailed in normal positions in an available route emanating from that entrance point. Thus, relay 2BY is picked up by the energization of a circuit closed from (+), including front contact 24 of relay 11NR, back contact 25 of relay 11XR, back contact 26 of relay 2RP, and winding of relay 2BY, to (—). When relay 2BY is picked up, a circuit is closed to cause the picking up of relay 4BY extending from (+), including front contact 24 of relay 11NR, back contact 25 of relay 11XR, back contact 26 of relay 2RP, front contact 27 of relay 2BY, front contact 28 of relay 2BY, wire 29, back contact 30 of relay 3RP, wire 31, back contact 32 of relay 4RP, and winding of relay 4BY, to (—). The picking up of relay 4BY closes a circuit portion at front contact 45 extending to the winding of relay 13XR to condition that exit relay so that it can be picked up if that exit point is designated by the actuation of the exit button 13XB. The relay 14XR is also conditioned for energization in a much similar manner because there is a possible route which may be established from 11 to 14.

To consider another typical condition under which the initiating networks are energized responsive to entrance designation (assuming the normal conditions to exit as they have been described), a condition will be considered involving optional routes emanating from the entrance point governed by signal 10 extending to the exit point at 13. Thus, if an operator designates the entrance point at signal 10 by the depression of button 10NB under such conditions, the entrance relay 10NR is picked up by the energization of a circuit comparable to that described for the picking up of relay 11NR, and the picking up of that relay feeds energy through the initiating circuit network for that direction of traffic to condition the exit relay 12XR so that it could be picked up upon designation of that exit point, and to condition the relay 13XR so that it could be picked up upon designation of that exit point, such conditioning circuit extending over the circuit portion of the initiating network corresponding to the route extending from 10 to 13 via crossover 4. The relay 14XR is also conditioned for energization dependent upon exit designation for that point because there is also a possible route available extending from 10 to 14.

To consider the circuit organization by which such exit relays are conditioned, the relay 14XB has positive energy applied to its winding by a circuit portion extending from (+), including front contact 33 of relay 10NR (see Fig. 1A), back contact 34 of relay 10XR, back contact 35 of relay 2NP, back contact 27 of relay 2BY, wire 36, back contact 37 of relay 3NP, wire 38, and back contact 39 of relay 4NP, to the winding of relay 14XR. It will be noted that the relay 4BY (see Fig. 1C) cannot be picked up under such conditions because the circuit by which such relay would necessarily be energized is open at front contact 28 of relay 2BY, relay 2BY being deenergized at that time because such relay is picked up only when there is a possible route including the lower track switch of crossover 2 trailed in a normal position in an available route emanating from the designated entrance point. Therefore, inasmuch as the relay 4BY cannot be picked up under the assumed conditions, and the picking up of that relay is essential to the conditioning for energization of the relay 13XR if a route is to be selected via crossover 2, such relay cannot be conditioned for energization by the circuit portion of the initiating network comparable to the route extending from 10 to 13 via that crossover. The circuit portion comparable to the route extending from 10 to 13 via crossover 4 is effective, however, to condition the relay 13XR so that it can be picked up. Such circuit portion extends from (+), including front contact 33 of relay 10NR (see Fig. 1A), back contact 34 or relay 10XR, back contact 40 of relay 2RP, wire 41, back contact 42 of relay 3NP, wire 43, back contact 44 of relay 4NP and back contact 45 of relay 4BY, to the winding of relay 13XR.

It will be noted from the circuits which have been described that the circuit for the conditioning of relay 14XR includes back contact 39 of relay 4NP and thereby checks that the track switches of crossover 4 are free to be operated to their reverse positions as would be required for derail protection if a route were to be established extending over the track switch 3 in its reverse position, and similarly, the relay 13XR can be conditioned for energization only after it is checked by back contact 42 of relay 3NP that the track switch 3 is free to be operated to its reverse position to provide derail protection for a route extending from 10 to 13 via crossover 4.

A similar mode of operation to that which has just been described is effective for setting up routes for the opposite direction of traffic by the energization of the other of the initiating networks. Inasmuch as hereinafter in the description it is desired to consider the establishment of a route from 13 to 10 via crossover 4, the energization of the initiating circuit network responsive to the designation of an entrance point at 13 for such route will be considered, assuming the normal conditions of the system to exist as they have been described. The depression of the button 13NB causes the picking up of the relay 13NR in a manner comparable to that which has been described for the relay 11NR and the picking up of that relay causes energy to feed through the circuit portion corresponding to the route extending over the crossover 4 to cause the picking up of the relay 2AY by the energization of a circuit closed from (+), including front contact 46 of relay 13NR (see Fig. 1C), back contact 47 of relay 13XR, back contact 48 of relay 4NP, wire 49, back contact 50 of relay 3NP, back contact 51 of relay 4AY, wire 52, back contact 53 of relay 2RP, and winding of relay 2AY, to (—). The picking up of that relay closes front contact 54 to condition the winding of relay 10XR so that such relay can be picked up upon the subsequent designation of that exit point in an obvious manner.

It will be noted that the initiating circuit just described includes back contact 50 of relay 3NP and thus checks that the track switch 3 can be operated to its reverse position for derail protection for the establishment of that route.

*Completion responsive to exit designation.—* Upon the designation of the exit end of a route to be established, subsequent to the designation of the entrance end thereof, the switch position selecting relays AN, BN, N and R are selectively energized to correspond to that route. The energization of such relays causes the energization of the switch control relays NP and RP to correspond with the normal and reverse switch position selected, and in addition the switch position selecting relays for the track switches included in portions of routes requiring derail protection cause the energization of the NP or RP switch control relay (dependent upon the position of the track switch required) to cause the power operation of the particular track switch providing the derail protection.

As a typical condition of how such general mode of operation is effective, assume an operator to designate an exit point at 13 by the depression of button 13XB, subsequent to the conditioning of the route extending from 10 to 13 via crossover 4 responsive to the entrance designation as heretofore described. The depression of that button causes the picking up of relay 13XR, and the picking up of that relay causes the picking up successively of relays 4R and 2AN, thus completing the selection of the positions of the track switches required for the establishment of that route. The picking up of relay 4R causes the energization of the switch control relay 4RP, and the picking up of relay 2AN causes the energization of the switch control relay 2NP. Inasmuch as derail protection is required for that route, the picking up of relay 4R also causes the picking up of the reverse switch control relay 3RP for track switch 3 to cause the operation of that track switch to a reverse position for derail protection.

To consider in detail the circuits for the energization of such relays, the depression of button 13XB under the above assumed conditions causes the picking up of relay 13XR by the energization of a circuit closed from (+), including front contact 33 of relay 10NR (see Fig. 1A), back contact 34 of relay 10XR, back contact 40 of relay 2RP, wire 41, back contact 42 of relay 3NP, wire 43, back contact 44 of relay 4NP, back contact 45 of relay 4BY, winding of relay 13XR, back contact 55 of relay 13NR, and contact 56 of button 13XB closed in a depressed position to (—). The picking up of that relay closes a stick circuit at front contact 57 to shunt contacts 55 and 56 out of the circuit just described.

When relay 13XR is picked up, the relay 4R is picked up by the energization of a circuit closed from (+), including front contact 58 of relay 13XR (see Fig. 1C), back contact 59 of relay 4BY, wire 60, upper winding of relay 4R, back contact 61 of relay 4AN, and back contact 62 of relay 4BN, to (—). When relay 4R is picked up a circuit is closed to cause the picking up of relay 2AN extending from (+), including front contact 58 of relay 13XR, back contact 59 of relay 4BY, wire 60, front contact 63 of relay 4R, wire 64, upper winding of relay 2AN, and back contact 65 of relay 2R, to (—).

The picking up of relay 4R causes the picking up of the reverse switch control relay 4RP by the energization of a circuit closed from (+), including front contact 66 of relay 4R (see Fig. 1B), wire 67, front contact 68 of relay 4L, back contact 69 of relay 4NP, and winding of relay 4RP, to (—). The picking up of relay 2AN causes the energization of relay 2NP upon closing a circuit extending from (+), including front contact 70 of relay 2AN (see Fig. 1A), front contact 71 of relay 2L, back contact 72 of relay 2RP, and winding of relay 2NP, to (—). The picking up of relay 4R also causes the energization of relay 3RP (to provide derail protection) upon the closing of a circuit extending from (+), including front contact 73 of relay 4R (see Fig. 1B), front contact 74 of relay 3L, back contact 75 of relay 3NP, and winding of relay 3RP, to (—).

The energization of an NP or RP relay for a track switch causes the power operation of that track switch to a respective normal or reverse position in a manner to be hereinafter considered more in detail.

A much similar mode of operation is effective in the establishment of the same route for the opposite direction of traffic, the relays NP and RP being energized by the same circuits which have been described, and the relays 4R and 2AN being picked up by the energization of their lower windings in accordance with the energization of circuits having a feed point dependent upon the picked up condition of the exit relay 10XR. Thus, assuming an operator to designate an exit point at 10 in the establishment of a route from 13 to 10 via crossover 4 the relay 10XR is picked up upon the depression of the button 10XB by the energization of a circuit closed from (+), including front contact 46 of relay 13NR (see Fig. 1C) back contact 47 of relay 13XR, back contact 48 of relay 4NP, wire 49, back contact 50 of relay 3NP, back contact 51 of relay 4AY, wire 52, back contact 53 of relay 2RP, front contact 54 of relay 2AY, winding of relay 10XR, back contact 76 of relay 10NR, and contact 77 of button 10XB closed in a depressed position, to (—). The picking up of that relay closes a stick circuit at front contact 78 of relay 10XR to shunt contacts 76 and 77 out of the circuit just described. The picking up of relay 10XR causes the picking up of relay 2AN by the energization of a circuit closed from (+), including front contact 79 of relay 10XR (see Fig. 1A), front contact 80 of relay 2AY, lower winding of relay 2AN, and back contact 65 of relay 2R, to (—). When relay 2AN is picked up, a circuit is closed to cause the picking up of relay 4R extending from (+), including front contact 79 of relay 10XR, front contact 80 of relay 2AY, front contact 81 of relay 2AN, wire 82, back contact 83 of relay 4AY, lower winding of relay 4R, back contact 61 of relay 4A, and back contact 62 of relay 4BN, to (—). The picking up of the relays 2AN and 4R under such conditions of course causes the energization of the NP and RP relays in a manner which has been described.

If the route is to be established extends from 10 to 14, and initiation has been effective responsive to entrance designation for the entering signal 10 under conditions as have been described when considering the conditioning of routes emanating from that entrance point, the depression of the exit button 14XB causes the picking up of relay 14XR by the energizing of a circuit extending from (+), including front contact 33 of relay 10NR (see Fig. 1A), back contact 34 of relay 10XR, back contact 35 of relay 2NP, back contact 27 of relay 2BY, wire 36, back contact 37 of relay 3NP, wire 38, back contact 39 of relay 4NP, winding of relay 14XR, back contact 84 of relay 14NR, and contact 85 of button 14XB, to (−). The picking up of that relay closes a stick circuit at front contact 86 to shunt contacts 84 and 85 out of the circuit just described.

Upon the picking up of relay 14XR, relay 3R is picked up by the energization of a circuit closed from (+), including front contact 87 of relay 14XR (see Fig. 1C), wire 88, upper winding of relay 3R and back contact 89 of relay 3N, to (−). When that relay is picked up, a circuit is closed to cause the picking up of relay 2R extending from (+), including front contact 87 of relay 14XR (see Fig. 1C), wire 88, front contact 90 of relay 3R, wire 91, back contact 92 of relay 2BY, upper winding of relay 2R, back contact 93 of relay 2AN, and back contact 94 of relay 2BN, to (−).

The picking up of relay 3R under such conditions causes the picking up of relay 3RP for the power operation of the track switch 3 by the energization of a circuit which has been described, and the picking up of relay 2R causes the picking up of relay 2RP by the energization of a circuit extending from (+), including front contact 95 of relay 2R (see Fig. 1A), front contact 96 of relay 2L, back contact 97 of relay 2NP, and winding of relay 2RP, to (−). The picking up of relay 3R in the establishment of that route also causes the picking up of relay 4RP for the operation of the track switches of crossover 4 to reverse positions for derail protection, such protection of course being more effective when the route is used between 11 and 14 over track switch 3 and therefore does not conflict with a parallel route which is afforded by the derail protection provided upon the operation of the track switches of crossover 4 to their reverse positions. The relay 4RP is picked up under such conditions by the energization of a circuit extending from (+), including front contact 98 of relay 3R, wire 67, front contact 68 of relay 4L, back contact 69 of relay 4NP, and winding of relay 4RP, to (−).

Another typical condition which illustrates the fulfillment of some of the novel features of the present invention can be considered upon assuming an operator, at a time when the normal conditions exist as they have been described, to cause the establishment of a route extending from 11 to 13. As has been heretofore described, the designation of the entrance end of such route causes the conditioning of the track switches of the crossovers 2 and 4 by the energization respectively of the relays 2BY and 4BY so that the track switches of those crossovers will be operated to normal positions when the exit end of that route is designated. The depression of the exit button 13XB under such assumed conditions causes the picking up of the exit relay 13XR by the energization of a circiut extending from (+), including front contact 24 of relay 11NR (see Fig. 1A), back contact 25 of relay 11XR, back contact 26 of relay 2RP, front contact 27 of relay 2BY, front contact 28 of relay 2BY, wire 29, back contact 30 of relay 3RP, wire 31, back contact 32 of relay 4RP, front contact 45 of relay 4BY, winding of relay 13XR, back contact 55 of relay 13NR, and contact 56 of button 13XB closed in a depressed position, to (−). The picking up of that relay closes a stick circuit at front contact 57 to shunt contacts 55 and 56 out of the circuit just described.

When relay 13XR is picked up in the establishment of a route from 11 to 13, the relay 4BN is picked up by the energization of a circuit extending from (+), including front contact 58 of relay 13XR (see Fig. 1C), front contact 59 of relay 4BY, wire 99, upper winding of relay 4BN, and back contact 100 of relay 4R, to (−). When relay 4BN is picked up a circuit is closed to cause the picking up of relay 3N extending from (+), including front contact 58 of relay 13XR, front contact 59 of relay 4BY, wire 99, front contact 101 of relay 4BN, upper winding of relay 3N, and back contact 102 of relay 3R, to (−). The relay 2BN is then picked up by the energization of a circuit extending from (+), including front contact 58 of relay 13XR, front contact 59 of relay 4BY, wire 99, front contact 101 of relay 4BN, front contact 103 of relay 3N, wire 91, front contact 92 of relay 2BY, upper winding of relay 2BN, and back contact 65 of relay 2R, to (−).

Relay 4NP is picked up upon the picking up of relay 4BN by the energization of a circuit extending from (+), including front contact 104 of relay 4BN (see Fig. 1B), wire 105, front contact 106 of relay 4L, back contact 107 of relay 4RP, an winding of relay 4NP, to (−). The relay 3NP is energized responsive to the picking up of relay 3N by the energization of a circuit extending from (+), including front contact 108 of relay 3N, front contact 109 of relay 3L, back contact 110 of relay 3RP, and winding of relay 3NP, to (−). The picking up of relay 2BN causes the relay 2NP to be picked up by the energization of a circuit extending from (+), including front contact 111 of relay 2BN (see Fig. 1A), front contact 71 of relay 2L, back contact 72 of relay 2RP, and winding of relay 2NP, to (−). The picking up of those NP relays causes the power operation of the track switches to correspond with the switch positions selected, and the signal governing entrance to such route is cleared, subsequent to the completion of the power operation of the track switches to set up that route, in a manner to be hereinafter described.

*Auxiliary switch control.*—It is desirable in entrance-exit systems to include auxiliary means for causing the power operation of the track switches whereby an operator can directly cause the power operation individually of each of the single track switches and of the track switches of each of the crossovers. Such operation is particularly desirable in order that an operator can most efficiently free any one of the track switches of obstructions. In order to provide flexibility in the use of the auxiliary switch control means, it is provided that the derail locking is ineffective for track switches having their operation called for in accordance with the actuation of the auxiliary switch control levers. Such arrangement can be safely provided because no provision is made for the clearing of the signal governing entrance to a route which has been set up by the actuation of the auxiliary switch control levers for the track switches involved in that route. Thus, if it is desirable to clear a signal governing entrance to a route which has been set up by the operation of the track switches in accordance with the auxiliary switch control means, it is necessary to designate the entrance and exit ends of such route by the actuation of the respective entrance and exit buttons and cause the selection thereof in a manner comparable to that which has been described. Such selection of course includes derail protection in a manner which has been described, and the signal governing entrance to such route can be cleared as will be hereinafter apparent, only after proper derail protection has been provided. An operator can, however, set up any possible route extending through the track layout by causing the track switches to be positioned in accordance with the actuation of the auxiliary switch control levers, and a train can be caused to pass over such route by hand signal in accordance with the provisions in railway practice.

The auxiliary switch control means provide for each of the crossovers and each of the track switches is similar to that which will be described as typical with reference to the control of the track switches of crossover 2. Thus, if an operator actuates the lever 2SML (see Fig. 1A) to a normal lower operating position at a time when the normal conditions of the system exist (or at some other time when the track switches of the crossover are free to be operated to their normal positions), the switch control relay 2NP for causing the power operation of the track switches of crossover 2 to normal positions is picked up by the energization of a circuit extending from (+), including contact 112 of lever 2SML in a lower position, front contact 71 of relay 2L, back contact 72 of relay 2RP, and winding of relay 2NP, to (—). The picking up of that relay causes the power operation of the track switches of crossover 2 in a manner to be hereinafter considered more in detail.

If the crossover 2 is to have its track switches operated to reverse positions in accordance with the actuation of the auxiliary lever 2SML to its upper reverse operating position at a time when the normal conditions exist as they have been described, the relay 2RP is picked up upon the energization of a circuit extending from (+), including contact 112 of lever 2SML in an upper position, front contact 96 of relay 2L, back contact 97 of relay 2NP, and winding of relay 2RP, to (—). The picking up of that relay of course causes the power operation of the track switches of crossover 2 to reverse positions in a manner to be hereinafter considered.

*Switch operation.*—Although it is believed to be readily apparent that the track switches could be properly operated directly by the relays NP and RP provided therefore, it is desirable that certain features be incorporated in the system which provided for reversal of each track switch in midstroke, and for the complete operation of a track switch once operation has been initiated. To provide those features, a polar neutral relay WZ is provided for each of the crossovers and for each of the single track switches for repeating the switch controls selected by the relays NP and RP, such WZ relays being shown in Fig. 3.

As conditions typical of the power operation of each of the track switches assume that a route has been established or selected as has been heretofore described including the track switches of crossover 2 in their reverse positions, such means being effective to cause the picking up of the reverse switch control relay 2RP. The picking up of that relay closes an obvious circuit for the lower winding of relay 2WZ at front contact 113, and the picking up of that relay causes the power operation of the switch machines 2ASM and 2BSM for the operation of the track switches 2A and 2B respectively to their reverse positions. Energy is applied to the control wires of such switch machines upon the closing of front contacts 114 and 115 in an obvious manner, the polarity applied to the control wires being effective to determine the normal or reverse positions to which the switch the machines are to be operated.

After the track switches of crossover 2 have been operated to their reverse locked positions, the reverse correspondence relay 2RCR is picked up by the energization of a circuit extending from (+), including back contact 116 of relay 2NP, winding of relay 2RCR, polar contact 117 of relay 2WP in a left-hand position, and front contact 118 of relay 2WP, to (—). It is believed obvious that the relay 2RCR will remain energized until the normal position of the track switch is called for by the picking up of relay 2NP.

If a route is selected requiring the track switches of crossover 2 to be operated to their normal positions, the picking up of the normal switch control relay 2NP causes the energization of the upper winding of relay 2WZ by an obvious circuit closed at front contact 116, and the picking up of that relay due to such energization causes the power operation of the track switches 2A and 2B to normal positions in accordance with the closing of front contacts 114 and 115. After the track switches of crossover 2 are locked in their normal positions the relay 2WP is picked up with its polar contacts operated to a right-hand position, and the normal correspondence relay 2NCR becomes energized by a circuit extending from (+), including back contact 113 of relay 2RP, winding of relay 2NCR, polar contact 117 of relay 2WP in a right-hand position, and front contact 118 of relay 2WP, to (—).

Stick circuits are provided for each of the relays WZ in order that such relay may be maintained energized for the complete operation of its track switch even though the route establishing means may be restored before such operation has been completed, such stick circuits being provided in a manner similar to that fully disclosed in the above mentioned patent to A. Langdon, Patent No. 2,148,865, dated February 28, 1939. The means provided for reversal of the track switch in midstroke is also believed to be obvious, dependent upon the normal and reverse windings of the relays WZ being oppositely connected in a manner fully described in that patent.

A relay LS is provided for each of the crossovers and each of the single track switches for opening the switch operating circuit after that track switch has completed its operation, and for use in the signal control circuits to insure that each of the track switches of a route has been called for has been completely operated to the called-for position before a signal governing entrance to the route can be cleared. The use of contacts of LS relays in the signal control circuits also of course proves that the switch operating circuits of each of the track switches included in each route are open prior to the clearing of the signal governing entrance to such route.

Inasmuch as the circuits for all of the relays LS are similar, the circuits relative to the control of relay 2LS will be considered more in detail as typical. Thus, with reference to Fig. 6, the relay 2LS is normally energized in accordance with the energized condition of a lock relay 2L used for repeating the different types of locking provided, by the energization of a circuit extending from (+), including front contact 119 of relay 2L, back contact 120 of relay 2WZ, and winding of relay 2LS, to (—). As soon as the reverse position of the track switches of crossover 2 is called for by the energization of the relay 2RP, the relay 2NCR is dropped away upon the opening of back contact 113 (see Fig. 3), and the dropping away of that relay closes a stick circuit for the relay 2LS (see Fig. 6) extending from (+), including front contact 119 of relay 2L, back contact 121 of relay 2RCR, back contact 122 of relay 2NCR, front contact 123 of relay 2LS, and winding of relay 2LS, to (—). When the relay 2RP is picked up in calling for the reverse operation of the track switches of crossover 2, the relay 2WZ becomes picked up as has been described, and the picking up of that relay closes a stick circuit for relay 2LS to maintain such relay energized until the track switches of crossover 2 have been completely operated to their reverse positions, such stick circuit being closed from (+), including front contact 120 of relay 2WZ, back contact 121 of relay 2RCR, back contact 122 of relay 2NCR, front contact 123, and winding of relay 2LS, to (—). When the relay 2RCR is picked up after the track switches of crossover 2 have been completely operated to their reverse positions, the stick circuit just described for relay 2LS is opened at back contact 121, and such relay is dropped away because its pick-up circuit is open at that time at back contact 120 of relay 2WZ. The dropping away of that relay opens the switch operating circuit at front contacts 124 and 125, and shunts the control wires extending to the switch machine. Such relay in dropping away also closes a portion of the circuit network used for the energization of signal control relays G as shown in Fig. 4 and as hereinafter described.

It will be noted that the stick circuit closed upon the picking up of relay 2WZ for relay 2LS shunts the front contact 119 of relay 2L out of the circuit for relay 2LS, and therefore provides that the switch operating circuits for the switch machines 2ASM and 2BSM will not be opened if such switch is in midstroke at a time when the lock relay 2L is dropped away.

*Signal control.*—With reference to Fig. 4, a circuit network is provided for the energization of the relays G for the control of the signals, such network being effective for the energization of the signal control relays G for both directions of traffic. It will be noted with reference to the circuits about to be described, that a relay G can be picked up for the clearing of a signal only after the track switches have been properly operated to set up a route emanating therefrom, providing that such route extending to the next signal for governing traffic in the same direction is unoccupied by a train (except where call-on signals are involved), and only if each track switch required to be operated for detail protection for that route has been properly operated to provide that protection.

As a typical example of how a signal is cleared after the above described conditions have been fulfilled, assume that a route has been set up as heretofore described extending from 10 to 13. When the track switches have been completely operated in accordance with that route and in accordance with the derail protection provided therefor, the relay 10G is picked up by the energization of a circuit extending from (+), including front contact 126 of relay 13XR, front contact 127 of relay 8TR, front contact 128 of relay 4RCR, front contact 129 of relay 3RCR, back contact 130 of relay 4NCR, back contact 131 of relay 4LS, front contact 132 of relay 4TR, back contact 133 of relay 2RCR, front contact 134 of relay 2NCR, back contact 135 of relay 2LS, front contact 136 of relay 3TR, back contact 137 of relay 10XR, front contact 138 of relay 10NR, and winding of relay 10G, to (—). When relay 10G is picked up, energy is applied to the winding of signal 10 upon the closing of front contacts 139 and 140 as shown in Fig. 5. Such energization of the signal 10 causes a yellow indication to be displayed, and causes the dropping away of relay 10RGP by the opening of contact 141. That contact when in its operated position in accordance with the energization of that signal causes the picking up of the signal repeater relay 10GYP in an obvious manner. If it is desired to provide a green indication for that signal, or for another signal, it can be provided by selecting the polarity of the signal control circuits as shown, for example in the prior application of Judge, Ser. No. 330,535, filed April 19, 1940. It will be noted that the energization of signal 10 can be effected only if the track switch 3 has been properly operated to its reverse position and the front contact 129 of relay 3RCR closed in the circuit for the signal control relay 10G.

If the same route is set up for the opposite direction of traffic, signal 13 is cleared subsequent to the picking up of the relay 13G. The relay 13G is picked up after a route is completely set up extending from 10 to 13 via crossover 4 by the energization of a circuit extending from (+), including front contact 137 of relay 10XR, front contact 136 of relay 3TR, back contact 135 of relay 2LS, front contact 134 of relay 2NCR, back contact 133 of relay 2RCR, front contact 132 of relay 4TR, back contact 131 of relay 4LS, back contact 130 of relay 4NCR, front contact 129 of relay 3RCR, front contact 128 of relay 4RCR, front contact 127 of relay 8TR, back contact 126 of relay 13XR, front contact 136 of relay 13NR, and winding of relay 13G, to (—). The picking up of relay 13G causes the clearing of signal 13 in a manner comparable to that described for the clearing of signal 10 with reference to Fig. 5.

It is believed obvious to those skilled in the art that the clearing of a call-on signal for governing entrance to a route is effected in a much similar manner. For example, the call-on signal 11C is cleared for governing entrance to a route which has been set up, if such entrance point has been designated by the rotation of the entrance button 11NB (see Fig. 1A), the rotation of such button being effective to cause the picking up of the call-on entrance relay 11CNR. With reference to Fig. 4, the call-on signal control relay 11CG is picked up after the route emanating from that point has been completely established, the circuit for the energization of that relay being comparable to the circuits for the other G relays except that track contact selections are omitted in accordance with the general principles for the governing of call-on signals.

*Electric locking.*—The picking up of a signal control relay G for a signal governing entrance to an established route renders the route locking effective for that route, as for example, the picking up of relay 13G in a manner which has been described when a route is set up from 13 to 10 via crossover 4 causes the route locking to become effective for that route. With reference to Fig. 6, the picking up of relay 13G under such conditions causes the dropping away of the west stick relay 8WS, and the dropping away of that relay effects the release successively of relays 4WS and 3WS. When the relay 8WS is dropped away, the circuit for the lock relay 4L is opened to cause such relay to be deenergized, and the dropping away of that relay with the track switches of crossover 4 in their reverse positions causes the deenergization of the lock relay 3L to lock the track switch 3 in its reverse position and provide derail locking for the route assumed to have been set up. The dropping away of relay 3WS of course causes the dropping away of the lock relay 2L to lock the track switches of crossover 2 in their normal positions.

To consider more specifically how such general mode of operation becomes effective, with reference to Fig. 6, the picking up of relay 13G opens a circuit normally closed for relay 8WS at back contact 142, such circuit extending from (+), including normally closed contact 143 of thermal relay 13TH, back contact 142 of relay 13G, front contact 144 of relay 13AS, front contact 145 of relay 8WS, and winding of relay 8WS, to (—). The relay 4WS is normally energized by a circuit extending from (+), including normally closed contact 146 of the thermal relay 12TH, back contact 147 of relay 12G, front contact 148 of relay 12AS, front contact 149 of relay 8WS connected in multiple with front contact 150 of relay 4NCR, front contact 151 of relay 4WS, and winding of relay 4WS, to (—). The front contact 150 of relay 4NCR is of course open when the route is established extending over the crossover, and the dropping away of relay 8WS causes the dropping away of relay 4WS by opening the circuit just described at front contact 149. The dropping away of relay 4WS opens the normally energized circuit for relay 3WS at front contact 152, such circuit extending from (+), including front contact 152 of relay 4WS, front contact 153 of relay 7WS connected in multiple with front contact 154 of relay 2NCR, front contact 155 of relay 3WS, and winding of relay 3WS to (—).

Relay 4L is normally energized by a circuit extending from (+), including front contact 156 of relay 8WS, front contact 157 of relay 8ES, front contact 158 of relay 8TR, front contact 159 of relay 4WS, front contact 160 of relay 4ES, front contact 161 of relay 4TR, front contact 162 of relay 3L connected in multiple with front contact 163 of relay 3NCR, winding of relay 4L, and front contact 164 of relay 4L, to (—). Such relay is of course dropped away when its circuit is opened at front contact 156 upon the dropping away of relay 8WS. The relay 3L is normally energized by a circuit extending from (+), including front contact 165 of relay 7WS, front contact 166 of relay 7ES, front contact 167 of relay 7TR, front contact 168 of relay 4L connected in multiple with front contact 169 of relay 4NCR, winding of relay 3L, and front contact 170 of relay 3L, to (—). That circuit is opened to cause relay 3L to drop away at front contact 168 by the dropping away of relay 4L, the front contact 169 of relay 4NCR being open at that time because of the establishment of the route extending over the crossover 4.

Relay 2L is normally energized by a circuit extending from (+), including front contact 165 of relay 7WS, front contact 166 of relay 7ES, front contact 167 of relay 7TR, front contact 171 of relay 3WS, front contact 172 of relay 3ES, front contact 173 of relay 3TR, winding of relay 2L, and front contact 174 of relay 2L, to (—). But such circuit is opened upon the dropping away of relay 3WS at front contact 171 to cause relay 2L to be dropped away.

The dropping away of the relays 2L, 3L, and 4L becomes effective to prevent the power operation of the track switches of crossovers 2 and 4 and of the single track switch 3, because the operating circuits of such crossovers and single track switches can be closed only when the relays LS provided therefor are energized. The dropping away of such lock relays of course prevents the energization of the relays 2LS, 3LS and 4LS by opening the circuits for such relays at front contacts 119, 175 and 176 respectively.

When a signal clears, the relay RGP for that signal is dropped away in a manner which has been described, and the dropping away of that relay causes the dropping away of the approach or time locking relay AS provided for that signal. Thus, under the conditions assumed for the setting up of a route from 13 to 10 via crossover 4, the dropping away of relay 13RGP causes the dropping away of the approach locking relay 13AS by opening the normally energized circuit for that relay which extends from (+), including front contact 177 of relay 13RGP, winding of thermal relay 13TH, front contact 178 of relay 13AS, and winding of relay 13AS, to (—). Such relay being dropped away provides approach locking in the usual manner in case an operator attempts to restore the route which has been established prior to the entrance of such route by an approaching train. That is, if restoration had been effected in a manner to be hereinafter described, the relay 13AS can be picked up with an approaching train occupying track section 9T only after the heating of the thermal relay 13TH. The picking up of relay 13AS is essential to the closing of the pick-up circuit for the route locking relay 8WS, and in that manner delays the restoration of the route locking.

*Restoration to normal.*—Restoration to normal of the parts of the system associated with the establishment of a route can be initiated manually by the pulling out of the entrance button NB for the signal governing entrance to such route, or can be initiated automatically (except where call-on signals are involved) upon the passage of a train past the signal governing entrance to the route under consideration.

As a typical example of how restoration can be effective responsive to the manual designation thereof, assume that a route has been set up as has been described extending from 13 to 10 via crossover 4, and the signal governing entrance to such route has been cleared. Also assume that an operator initiates the restoration of the parts of the system associated with the setting up of that route by the pulling out of the entrance button 13NB. The pulling out of that button causes the dropping away of relay 13NR by opening the circuit for that relay at normally closed contact 179 of that button (see Fig. 1C), and the dropping away of that relay causes the dropping away of relays 2AY and 10XR by opening their circuits at front contact 46. When relay 13NR is dropped away the relay 13G is deenergized by the opening of its circuit at front contact 186 (see Fig. 4), and the dropping away of that relay causes the restoration to stop of signal 13 and therefore causes the energization of the stop repeater relay 13RGP. When such relay becomes energized the relay 13AS (see Fig. 6) is picked up (if the approach track section 9T is unoccupied by a train) upon the energization of a circuit extending from (+), including front contact 177 of relay 13RGP, front contact 180 of relay 9TR, and winding of relay 13AS, to (—). If such track section is occupied by a train at that time the relay 13TH has its winding energized to heat its thermal element by a circuit extending from (+), including front contact 177 of relay 13RGP, winding of relay 13TH, and back contact 178, to (—). After the relay 13TH has had sufficient time to heat, the contact 181 of such relay is closed to cause the picking up of relay 13AS by the energization of a circuit extending from (+), including front contact 177 of relay 13RGP, contact 181 of relay 13TH closes in its heated position, and winding of relay 13AS, to (—). The picking up of that relay of course establishes a normally energized circuit which has been described.

After the thermal element of the thermal relay 13TH has cooled, a circuit is closed to cause the picking up of relay 8WS extending from (+), including contact 143 of relay 13TH, back contact 142 of relay 13G, front contact 144 of relay 13AS, front contact 182 of relay 8TR, and winding of relay 8WS, to (—). The picking up of that relay of course establishes a normally energized stick circuit which has been described.

The picking up of relay 8WS under the above asumed conditions causes the picking up of relay 4WS by the energization of a circuit extending from (+), including contact 146 of thermal relay 12TH, back contact 147 of relay 12G, front contact 148 of relay 12AS, front contact 149 of relay 8WS, front contact 183 of relay 4TR, and winding of relay 4WS, to (—). The picking up of that relay of course closes a stick circuit which has been described.

When relay 4WS is picked up, a circuit is closed to cause the picking of relay 3WS extending from (+), including front contact 152 of relay 4WS, front contact 154 of relay 2NCR, front contact 184 of relay 3TR, and winding of relay 3WS, to (—). When that relay is picked up a normally energized stick circuit which has been described is closed.

When relay 8WS is picked up, the closing of front contact 156 causes the picking up of the lock relay 4L in an obvious manner, the pick-up circuit for such relay including normally closed center contact 185 of the auxiliary switch control lever 4SML to provide that switch operation by auxiliary control can be effective only responsive to the lever 4SML when such lever is operated at a time when the lock relay 4L is energized. The relay 3L is restored to normal upon the closing of front contact 168 of relay 4L, and the relay 2L is picked up upon the closing of front contact 171 of relay 3WS.

With reference to Figs. 1A, 1B and 1C, the dropping away of relay 10XR causes the dropping away of the relay 2AN and 4R by opening the circuits for such relay at front contact 79. The dropping away of relay 2AN opens the pick-up circuit for relay 2NP at front contact 70, and the dropping away of relay 4R opens the pick-up circuit for relay 4RP at front contact 66 (see Fig. 1B). The dropping away of relay 4R also opens the pick-up circuit for the relay 3RP (which has been picked up for derail protection) to cause that relay to be dropped away. The relays 2NP, 3RP, and 4RP are dropped away if the lock relays L for those respective track switches have been picked up. If such lock relays have not been picked up, the relays 2NP, 3RP and 4RP are maintained energized by their stick circuits in a manner and for the purposes to be hereinafter considered.

The dropping away of relay 2NP causes the dropping away of relay 2WZ by opening its circuit at front contact 116 (see Fig. 3) and the dropping away of relay 2WZ causes the picking up of the relay 2LS by closing a pick-up circuit for that relay (see Fig. 6) extending from (+), including front contact 119 of relay 2L, back contact 120 of relay 2WZ, and winding of relay 2LS, to (—). In a similar manner the dropping away of relays 4RP and 3RP causes the dropping away of relays 4WZ and 3WZ and the energization respectively of the lock relays 4LS and 3LS.

A much similar mode of operation is effective upon restoration to normal upon passage of a train, except that the rear release route locking maintains the portions of the route established extending in advance of a train, and allows the restoration of the various parts of the route associated with the various track switches as the detector track sections of such track switches become unoccupied in the rear of a train. Such mode of operation is effective for providing the rear release of the derail locking as well as for the rear release of portions of the route being used. That is, for example, the passage of a train over the route which has been considered extending from 13 to 10 via crossover 4 maintains the track switch 3 locked in its reverse position for derail protection as long as the electric locking is effective for the track switches of the portion of the route extending over crossover 4 for which such derail locking is provided. As soon as the train in passing through the route has left the detector track section for the upper end of crossover 4, the route locking is restored for that track section, and restoration becomes effective for the parts of the system associated with the establishment of the route over the crossover 4 and also for the parts of the system associated with the derail locking provided by the single track switch. Thus, at that time, the rear release route locking provides that the track switch 3 is free to be operated as well as the track switches of the crossover 4, and it is therefore possible to set up a route extending from 11 to 13, for example, while a portion of the route assumed to have been first established, is still maintained including the upper end of crossover 2.

To consider in detail the circuits effecting such general mode of operation, assume a train to enter an established route extending from 13 to 10 via crossover 4. The passage of such train causes the dropping away of relay 13NR by opening the stick circuit for that relay at front contact 187 of relay 8TR (see Fig. 1C), and the dropping away of that relay causes the restoration of the signal to stop in a manner which has been described. The picking up of the relay 13RGP after the signal has been restored to stop closes a pick-up circuit for the relay 13AS (see Fig. 6) extending from (+), including front contact 177 of relay 13RGP, back contact 188 of relay 8TR, and winding of relay 13AS, to (—). The picking up of that relay establishes a normally energized stick circuit which has heretofore described. Inasmuch as the picking up of relay 8TR is essential to the closing of a pick-up circuit for the relay 8WS, such WS relay can be picked up only after the restoration in the rear of the train of the track relay 8TR, and in a similar manner, the picking up of each of the other WS relays associated with the route locking for that route is effected only after the picking up of the track relay TR in the rear of the train for that particular detector track section.

The lock relays L for the various track switches included in the route and for the single track switch providing derail protection, are energized when the route locking relays WS for the detector track sections with which such lock relays are associated have been energized. Thus, the relay 4L is picked up when the train has left the detector track section 4T, and the picking up of relay 4L causes the picking up of relay 3L in a manner which has been described. The relay 2L is picked up only after the train has passed the exit end of the route under consideration.

Stick circuits are provided for the relays NP and RP in order that such relays may be maintained energized as long as the particular crossovers and single track switches with which they are associated are included in established routes in advance of a train. The maintaining energized of these relays is effective to open portions of the initiating circuit networks to cause in effect circuit points of conflict corresponding to points of conflict at the track layout of conflicting routes, and therefore prevent the conditioning for energization of any exit relay for a route which is unavailable for use. Such a circuit arrangement provides what is conveniently called in practice "the prevention of preconditioning of routes."

With reference to Fig. 1A, the relay 2NP, for example, is maintained picked up as long as the locking is effective for that detector track section by the energization of a stick circuit extending from (+), including back contact 189 of relay 2L, front contact 190 of relay 2NP, back contact 72 of relay 2RP, and winding of relay 2NP, to (—). Such relay is made slightly slow in dropping away to allow for the shifting of the contacts of relay 2L to establish a stick circuit just described and open the pick-up circuit for the relay 2NP at front contact 71.

In a similar manner the relay 4RP is maintained energized as long as the electric locking is effective for the crossover 4 by the energization of a circuit extending from (+), including back contact 191 of relay 4L, front contact 192 of relay 4RP, back contact 69 of relay 4NP, and winding of relay 4RP, to (—). The relay 3RP is maintained energized by a stick circuit dependent upon the electric locking when the track switch 3 is used for derail protection under the conditions assumed above. The relay 3RP is energized under such conditions by a stick circuit extending from (+), including back contact 193 of relay 3L, front contact 194 of relay 3RP, back contact 75 of relay 3NP, and winding of relay 3RP, to (—).

From the stick circuits which have just been described it is believed to be obvious that the release of the electric locking in the rear of a train causes the release of the NP or RP relay for each of the track switches in the section which has been released, and the dropping of such NP or RP relay is effective to cause the dropping away of the relay WZ for that track switch and the subsequent energization of the relay LS for that track switch in a manner corresponding to that which has been described.

*Indications.*—Although various systems of indications can be used with the system provided by the present invention, this embodiment has been shown as having magnetically operated switch point indicators for the various track switches on the miniature track diagram (see Fig. 1A) for indicating the positions which have last been called for for the various track switches. As an indication of the locked condition of the various track switches, indicator lamps are provided at points along the diagram comparable to the switch points at the track layout, and such lamps are illuminated when the corresponding track switches are locked, or when a route has been called for by the route establishing means which requires such track switches to be locked.

Each of the magnetically operated switch point indicators is energized with one polarity or the other in accordance with the position of the polar contacts of the relay WZ for that crossover or single track switch as, for example, the switch point indicator for the track switches of crossover 4 is energized in accordance with the position of the polar contact 195 of relay 4WZ. If the track switches of crossover 4, for example, are included in a route which has been selected by the route establishing means, the lamps 4ALK and 4BLK (see Fig. 7), are illuminated by the energization of a circuit extending from (+), including front contact 196 of relay 4WZ, and the lamps 4ALK and 4BLK connected in multiple, to (—). If the track switches of that crossover become locked at a time when there is no route established and relay 4WZ is dropped away, the back contact 197 of relay 4L applies energy to the circuits for those indicator lamps.

It is to be understood that various novel features of the present invention can be applied as sub-combinations to other types of entrance-exit systems. That is, for example, the method of governing the conditioning relays Y to provide that only certain routes can be established by entrance-exit control is applicable to a system such as that shown in the patent to A. Langdon, Patent No. 2,148,865, which does not employ NP and RP relays for derail protection; and, conversely, the method herein disclosed for providing derail protection can be applied to a system such as that of the Langdon patent without employing the special type of initiating circuits also provided by the present invention.

Having described one embodiment of the present invention as applied to a specific track layout, it is desired to be understood that this form is selected to facilitate in the disclosure of the present invention rather than to limit the number of forms which the invention may assume, and it is to be further understood that various modifications, adaptations and alterations may be applied to the specific form shown in accordance with the requirements of practice, without in any manner departing from the spirit or scope of the present invention except as limited by the appended claims.

What I claim is:

1. In a switch and signal control system of the character described for a track layout having first and second alternative routes for the same direction of traffic provided by power switches extending between a particular entrance point and an exit point, such track layout also having a third route for the same direction of traffic extending from an entrance point distinctive from said particular entrance point to said exit point, such third route having a common portion of trackway with said first route but such portion being independent of said second route; manually operable contact means for designation of the respective entrance and exit points; an exit relay for said exit point; an initiating circuit network for the energization of said exit relay having circuit portions corresponding to the various portions of trackway of said track layout, such circuit network having feed points at one end for said respective entrance points and having said exit relay connected at the other end in a circuit arrangement so as to render the energization of said exit relay effective only when the respective entrance and exit ends of one of said routes have been designated and the circuit portions corresponding to such route are closed to form a complete initiating circuit path, the circuit portion comparable to said common portion of trackway being closed only when said entrance point for said third route has been designated; and route establishing means effective in response to the energization of said exit relay to cause the power operation of the track switches to set up the route corresponding to the circuit portion of said circuit network by which said exit relay has been energized.

2. In a switch and signal control system of the character described for a track layout having first and second alternative routes for the same direction of traffic provided by power switches extending between a particular entrance point and an exit point, such track layout also having a third route for the same direction of traffic extending from an entrance point distinctive from said particular entrance point to said exit point, such third route having a common portion of trackway with said first route, but such portion being independent of said second route; manually operable contact means for designation of the respective entrance and exit points; a route selecting relay for each of the track switches; a circuit network for the energization of the route selecting relays having circuit portions corresponding to the various portions of trackway of said track layout, such circuit network having connected thereto feed points at one end comparable to said respective entrance points, and having said route selecting relay for each track switch connected thereto at a point of the circuit network comparable to such track switch in such a manner as to render the energization of each of such relays effective after one of said entrance points has been designated, only if the portion of said circuit network is closed extending to that relay from the feed point corresponding to that designated entrance point, and only if such track switch would be required to be trailed in a particular position in that route, a certain one of said route selecting relays being effective to maintain the portion of the circuit network open comparable to said common portion of trackway except when said entrance point for said third route has been designated; and switch operating means effective in response to the designation of said exit point subsequent to the designation of one of said entrance points to cause the power operation of each track switch required to set up a route corresponding to the closed circuit portion of said circuit network extending between the designated entrance and exit points.

3. In a switch and signal control system of the character described for a track layout providing by power switches first and second routes for the same direction of traffic, each of such routes having its own respective entrance and exit points distinctive from the other, but both routes using a common portion of trackway; manually operable contact means for designation of the respective entrance and exit points; a route selecting relay for each of the track switches; a circuit network for the energization of the route selecting relays having a circuit portion corresponding to each of the various portions of trackway of said track layout, such circuit network having connected thereto feed points at one end comparable to said respective entrance points, and having said route selecting relay for each track switch connected thereto at a point in the circuit network comparable to such track switch in such a manner as to render the energization of such relays effective after one of said entrance points has been designated, only if the portion of said circuit network is closed extending to that relay from the feed point corresponding to the designated entrance point, and only if such track switch would be required to be trailed in a given position in that route, a certain one of said route selecting relays being effective when said entrance point for said first route is designated to open the circuit portion of the network, exclusive of the circuit portion comparable to said first route, corresponding to a route extending from that entrance point to the exit point of said second route; and switch operating means effective in response to the designation of either of said exit points subsequent to the designation of the entrance point of that route for causing the power operation of the track switches to set up that route, only if the circuit portion of said circuit network corresponding to that route is closed.

4. In a switch and signal control system of the entrance-exit type; a track layout providing by power switches a plurality of conflicting routes extending between entrance and exit points, one of such routes having derail protection provided by a particular track switch of an adjoining route when such switch is operated to a particular postion; a detector track section for said particular track switch; manually operable contact means for designating upon actuation thereof the respective entrance and exit points; route establishing means responsive to the designation respectively of the entrance and exit points of any given one of the routes for selecting the normal or reverse position of each of the track switches required to establish that route, such route establishing means being effective responsive to entrance and exit designation for said one route only if said particular track switch is in said particular position or is free to be operated to that position at the time such entrance and exit points are designated; and circuit means effective to lock said particular track switch when said detector track section is occupied by a train.

5. In a switch and signal control system of the entrance-exit type for a track layout providing by power switches a plurality of conflicting routes extending between signal locations constituting entrance and exit points, a particular one of such routes having derail protection provided by a particular one of said power switches of an adjoining route when it is operated to a particular position; manually operable contact means for the respective entrance and exit points; a switch control lever having distinctive normal and reverse operating positions and a neutral position for each of the power switches; route establishing means effective upon the actuation of said contact means for the respective entrance and exit ends of each of the routes for causing the power operation of each of the track switches required to establish that route, such route establishing means being effective to cause the power operation of said particular power switch to said particular position required for derail protection when said particular route has its respective entrance and exit points designated by the actuation of said contact means; and auxiliary switch control means effective upon the actuation of said switch control lever for each of the track switches included in said particular route to an operating position corresponding to the position required for that track switch in that route, for causing the power operation of each of the track switches to a position required to set up that route, such auxiliary switch control means being ineffective to cause the operation of said particular power switch.

6. In a switch and signal control system of the character described for a track layout providing by power switches a plurality of conflicting routes extending between entrance and exit points, a particular one of such routes having derail protection provided by a particular one of said power switches when operated to a particular position; manually operable contact means for designation of the respective entrance and exit points; a switch control lever for each of the track switches having normal and reverse control positions and a neutral position; normal and reverse switch control relays for each of the track switches; route establishing circuit means effective upon the actuation of said contact means for the respective entrance and exit points of each of the routes for selectively energizing said normal and reverse switch control relays for the various track switches in accordance with the normal or reverse position of that track switch required to establish that route, such route establishing circuit means being effective to cause the operation of said particular power switch to said particular position required for derail protection when said particular route has its entrance and exit points designated by the actuation of said contact means; and circuit means effective upon the actuation of said switch control lever for each of the track switches included in said particular route to an operating position corresponding to the position required for that track switch to set up that route, for selectively energizing said normal and reverse switch control relays in accordance with that route without effecting the operation of said particular power switch.

7. In a switch and signal control system of the entrance-exit type for a track layout providing by power switches a plurality of conflicting routes extending between signal locations constituting entrance and exit points, with a certain one of the power operated track switches at times acting to provide derail protection for a particular one of said routes and at other times for establishing various different routes; a detector track section for each of the power switches; manually operable contact means for designation of each of the respective entrance and exit points; route establishing means responsive to the actuation of said contact means for the respective entrance and exit points of each of the routes for causing the power operation of the track switches to establish that route, such route establishing means for said particular route also being effective to cause the power operation of said certain power operated track switch to a position to provide derail protection for that route; and route locking means rendered effective upon the complete establishment of each of the routes to maintain that route established in advance of a train but to unlock each track switch in that route when said detector track section for that switch becomes unoccupied in the rear of a train, such route locking means being effective to lock said certain power operated track switch when said particular route is established.

8. In a switch and signal control system of the character described for a track layout having a plurality of conflicting routes provided by power switches extending between signal locations constituting entrance and exit points, a particular one of such routes having derail protection provided by a particular one of said power switches which is at times used for establishing different routes; a detector track section having a track relay for each of the power switches; manually operable contact means for designation of each of the respective entrance and exit points; route establishing means responsive to the actuation of said contact means for the respective entrance and exit points of each of the routes for causing the power operation of the track switches to establish that route, such route establishing means for said particular route being effective to cause the power operation of said particular track switch to such a position as to protect said particular route; and route locking means rendered effective upon the complete establishment of each of the routes to maintain that route established in advance of a train but to unlock each track switch in that route when said detector track section for that switch becomes unoccupied in the rear of the train, such route locking means for said particular route being effective to lock said particular switch only as long as the portion of said particular route that is being protected by said particular track switch is locked by said route locking means.

9. In a switch and signal controlling system of the entrance-exit type for a track layout having a plurality of track portions for providing a plurality of different routes between different entrance and exit points interconnected by power operated track switches, manually operable contact means associated with each of said entrance and exit points, initiating circuit means including preselecting relay means and having circuit portions corresponding to the different track portions, means responsive to the operation of the manually operable contact means for any given entrance point to apply operating potential to the initiating circuit means at a corresponding point for energizing said preselecting relay means as required to connect said circuit portions for the various possible routes originating at that entrance point to supply an operating potential to the manually operable contact means for the exit ends of those routes, said initiating circuit means including contacts of said preselecting relay means for preventing the connection of the circuit portions for a certain one of said possible routes in response to the operation said manually contact means for a particular one of said entrance points although such certain route has its track portions in common with other possible routes, and route establishing means controlled by the operation of a manually operable contact means for an exit point supplied with operating potential for causing the power operation of each of the track switches as required to set up a route extending between that point and the entrance point supplying such operating potential, whereby certain possible routes that would ordinarily be establishable because of their relationships to other routes, may be prevented from being established.

10. In an entrance-exit type of switch control system, a track layout including one track switch providing routes converging from different entrance points and extending over another track switch to a plurality of exit points, an entrance button for each of said entrance points, an exit button for each of said exit points, electro-responsive means associated with said one track switch, means effective to energize said electro-responsive means by actuation of an entrance button for a route converging over said switch in one position but ineffective to energize such electro-responsive means by actuation of an entrance button for a route converging over said switch in the other position, means controlled by said electro-responsive means when in one position to render only certain of said exit buttons effective and when in the other position to render all of said exit buttons effective, and route establishing means governed by said electro-responsive means and controlled by the operation of an entrance button followed by the actuation of an effective exit button for operating said track switches to proper positions for establishing the route defined by such entrance and exit buttons, whereby a particular one of the routes converging over said track switch is prevented from being established.

11. In an entrance-exit type of switch and signal control system for a track layout having a plurality of track portions between signal locations constituting entrance and exit points and such track portions interconnected by power operated track switches to form different traffic routes, manually operable contact means associated with each of said entrance and exit points, an initiating circuit network having circuit portions corresponding to the various track portions and at times interconnected to form an initiating circuit for each of the possible routes through said track layout to supply potential from an operated entrance button to an exit button for each of the routes originating at the corresponding entrance point, means responsive to the operation of a certain entrance button but not to another for preventing the flow of current over the circuit portion corresponding with that particular route that is desired not to be used, but permitting the portion of track corresponding to such circuit portion to be used in other routes, means responsive to the operation of a manually operable contact means for any given exit point supplied with an operating potential for causing the operation of the power track switches as required to set up a route extending between that exit point and the entrance point supplying the operating potential for that exit button.

12. In a switch and signal control system of the entrance-exit type for a track layout having track portions for providing a plurality of different routes between signal locations constituting entrance and exit points by the power operation of track switches to their different positions, manually operable entrance and exit push buttons associated with said signal locations, preselecting relay means for said track switches, an initiating circuit network having circuit portions corresponding to the various track portions and interconnected by contacts of said preselecting relay means, means including said initiating circuit network for controlling the energization of said preselecting relay means upon the operation of any given entrance button to interconnect the circuit portions for each of the routes originating at the corresponding entrance point and rendering the exit buttons for such routes effective for operation, said means acting with respect to a certain entrance button for preventing the interconnection of the circuit portions for a particular one of the routes originating at that entrance location to prevent the exit button for such particular route from being rendered effective, and means responsive to the operation of an effective exit button for operating the track switches in accordance with said preselecting relay means and the positions required of such switches to set up a route extending between the corresponding exit point and the entrance point corresponding to the operated entrance button which rendered such exit button effective.

13. In a swtch and signal control system of the entrance-exit type for a track layout having two different entrance points and two different exit points interconnected by portions of track and track switches to provide four different conflicting routes for traffic in the same direction and all of such routes having a portion of track in common, manually operable contact means associated with each of said entrance and exit points, initiating circuit means responsive to the operation of the manually operable contact means for a particular one of said entrance points for conditioning for operation the manually operable contact means associated with each of said exit points, but responsive to the operation of the manually operable contact means for the other of said entrance points for conditioning for operation the manually operable contact means for only a particular one of said exit points, and route establishing means controlled by the operation of a conditioned manually operable contact means for an exit point for causing the power operation of each of the track switches as required to set up a route extending between that exit point and the entrance point providing the conditioning for such exit point, whereby only three of the four conflicting routes can be set up by entrance-exit manipulations.

14. In a switch and signal control system of the entrance-exit type for a track layout having portions of track providing a plurality of different routes between entrance and exit points by the power operation of track switches to interconnect such track portions, manually operable entrance and exit buttons associated with the respective entrance and exit points, an initiating circuit network having circuit portions corresponding to said track portions, means governed by the operation of different entrance buttons for governing the continuity of said initiating circuit portions for routes originating at corresponding entrance points to provide a complete initiating circuit path for certain of said routes but to prevent the completion of the initiating circuit path for a particular one of such routes, and route establishing means responsive to the actuation of an entrance button for any given entrance point followed by the actuation of an exit button for the exit end of a route originating at such entrance point and having a completed initiating circuit path for causing the power operation of the track switch to establish that route, whereby any particular one of the various possible routes through a track layout may be prevented from being established by entrance-exit operation although the entrance and exit ends of that route may be the entrance and exit ends of other routes.

15. In a switch and signal control system of the entrance-exit type, a track layout having a plurality of power operated track switches for providing different conflicting and non-conflicting routes between entrance and exit points of which certain track switches included in a particular route are also included in different non-conflicting routes, entrance and exit buttons for said respective entrance and exit points, route establishing means responsive to the actuation of an entrance button for the entrance end of a desired route followed by the actuation of the exit button for the exit end of that route to cause the power operation of the track switches to establish that route and at the same time cause the power operation of an adjacent switch from a position providing a route conflicting with said desired route to a position for a non-conflicting route to thereby in effect provide derail protection for said desired route, and means effective to prevent said route establishing means from acting to set up a desired route in response to the actuation of entrance and exit buttons at its opposite ends unless said adjacent switch is in a condition to be properly positioned to provide derail protection for such desired route.

16. In a switch and signal control system of the entrance-exit type, a track layout providing by power operated track switches a plurality of conflicting routes extending between entrance and exit points, one of such routes having derail protection provided by a particular track switch of an adjoining conflicting route when such switch is operated to an opposite non-conflicting position, a detector track section associated with said particular switch and effective to prevent its power operation when such track section is occupied by a train, manually operable contact means associated with each of said entrance and exit points, route establishing means responsive to the actuation of the manually operable contact means for the entrance end of any given route followed by the actuation of the manually operable contact means of the exit end of that route to cause the power operation of the track switches as required to establish that route, said route establishing means also acting in the case of said one route to operate said particular track switch to said opposite non-conflicting position, and means for rendering said route establishing means ineffective to establish said one route if said detector track section is preventing the operation of said particular track switch unless said particular track switch is already in its opposite non-conflicting position at the time of the actuation of the entrance and exit buttons, whereby the presence of a train in a detector track section of a derail protective switch prevents the establishment of the route to be protected unless such switch is already in a protecting position.

17. In a switch and signal control system of the entrance-exit type, a track layout having a plurality of power operated track switches for providing different conflicting and non-conflicting routes between entrance and exit points of which certain track switches included in a particular route are also included in different non-conflicting routes, entrance and exit buttons for said respective entrance and exit points, normal and reverse switch control relays for said track switches for respectively governing their normal and reverse operation, preselecting relay means associated with said track switches, an initiating circuit network responsive to the actuation of any given entrance button for controlling the energization of said preselecting relay means to provide an initiating circuit path for each route originating at the corresponding entrance point, said initiating circuit path for any given route also including contacts of said normal and reverse relays for the track switches in that route and for any track switch that may provide derail protection for that route in such a manner as to determine the availability of that route and its protective switches, and completion circuit means responsive to the actuation of the exit button for the exit end of the desired route only if the initiating circuit path for that route is complete for causing the power operation of the track switches as required to establish that route and at the same time to cause the power operation of any track switch that may provide derail protection for that route, whereby the availability of a route and the protective switches for such route is checked prior to the operation of such switches.

18. In a switch and signal control system of the entrance-exit type, a track layout having a plurality of power operated track switches for providing different conflicting and non-conflicting routes between entrance and exit points of which certain track switches included in a particular route are also included in different non-conflicting routes, entrance and exit buttons for said respective entrance and exit points, normal and reverse switch control relays for said track switches for respectively governing their normal and reverse power operation, route establishing means comprising initiation and completion circuits for respectively controlling preselecting and completion relays in response to the actuation of the entrance button for the entrance end of a desired route followed by the actuation of the exit button for such route for acting on said normal and reverse relays for the switches of such route to establish that route, circuit means controlled by the completion relays for certain switches of that route for acting on the normal and reverse switch control relays of an adjacent switch to actuate it to a position to provide derail protection for the desired route, auxiliary levers for each of said track switches, and circuit means associated with each auxiliary switch control lever for energizing its respective normal or reverse switch control relay when operated from a neutral position to a corresponding normal or reverse controlling position, whereby each switch can be operated individually by its auxiliary lever without operating an adjacent derail protective switch although such protective switch is automatically operated by the route establishing means both to provide derail protection and to establish other routes.

NELSON B. COLEY.